(12) United States Patent
Altman et al.

(10) Patent No.: US 7,516,310 B2
(45) Date of Patent: Apr. 7, 2009

(54) METHOD TO REDUCE THE NUMBER OF TIMES IN-FLIGHT LOADS ARE SEARCHED BY STORE INSTRUCTIONS IN A MULTI-THREADED PROCESSOR

(75) Inventors: Erik R. Altman, Danbury, CT (US); Vijayalakshmi Srinivasan, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 173 days.

(21) Appl. No.: 11/422,996

(22) Filed: Jun. 8, 2006

(65) Prior Publication Data

US 2007/0288727 A1    Dec. 13, 2007

(51) Int. Cl.
*G06F 9/00* (2006.01)
(52) U.S. Cl. ..................... 712/225
(58) Field of Classification Search ........... 712/214, 712/215, 216, 219, 225; 711/141
See application file for complete search history.

(56) References Cited

U.S. PATENT DOCUMENTS

| | | | | |
|---|---|---|---|---|
| 5,467,473 A * | 11/1995 | Kahle et al. | ............... | 712/23 |
| 5,918,005 A * | 6/1999 | Moreno et al. | ............... | 714/38 |
| 5,974,438 A * | 10/1999 | Neufeld | ............... | 718/104 |
| 6,108,770 A * | 8/2000 | Chrysos et al. | ............... | 712/216 |
| 6,230,230 B1 * | 5/2001 | Joy et al. | ............... | 710/200 |
| 6,246,684 B1 * | 6/2001 | Chapman et al. | ............... | 370/394 |
| 6,269,425 B1 * | 7/2001 | Mounes-Toussi et al. | ... | 711/133 |
| 6,381,691 B1 * | 4/2002 | Altman et al. | ............... | 712/236 |
| 6,519,683 B2 * | 2/2003 | Samra et al. | ............... | 711/125 |
| 6,772,255 B2 * | 8/2004 | Daynes | ............... | 710/200 |
| 6,816,952 B1 * | 11/2004 | Vartti et al. | ............... | 711/163 |
| 6,986,010 B2 * | 1/2006 | Sutanto et al. | ............... | 711/163 |
| 7,085,911 B2 * | 8/2006 | Sachedina et al. | ............... | 711/206 |
| 7,127,561 B2 * | 10/2006 | Hill et al. | ............... | 711/145 |
| 7,266,648 B2 * | 9/2007 | Sutanto et al. | ............... | 711/145 |
| 7,318,127 B2 * | 1/2008 | Hrusecky et al. | ............... | 711/145 |
| 2001/0032281 A1 * | 10/2001 | Daynes | ............... | 710/200 |
| 2002/0087793 A1 * | 7/2002 | Samra et al. | ............... | 711/125 |
| 2003/0126375 A1 * | 7/2003 | Hill et al. | ............... | 711/145 |
| 2004/0117573 A1 * | 6/2004 | Sutanto et al. | ............... | 711/163 |
| 2004/0154012 A1 * | 8/2004 | Wang et al. | ............... | 717/158 |

(Continued)

OTHER PUBLICATIONS

Ananian, C. Scott; Asanovic, Krste; Kuszmaul, Bradley C.; Leiserson, Charles E.; and Lie, Sean. "Unbounded Transactional Memory". Proceedings of the 11th Internation Symposium on high-Performance Computer Architecture. © 2005 IEEE.*

(Continued)

*Primary Examiner*—Aimee J Li
(74) *Attorney, Agent, or Firm*—Cantor Colburn LLP; Lou Percello

(57) ABSTRACT

A method for reducing the number of times in-flight loads must be searched by store instructions in a multi-threaded processor. A load issue for a thread t_old is frozen for a number of cycles. A $t_{13}$ new load instruction is rejected. A notification is sent to the rest of the processor that the t_new load instruction has been rejected. A load reorder queue (LRQ) of a t_old is snooped for any load which comes from a cache line L accessed by the load instruction and then forces such loads to be re-executed. Ownership of line L is changed to thread t_new.

3 Claims, 1 Drawing Sheet

U.S. PATENT DOCUMENTS

2005/0216673 A1* 9/2005 Kumar et al. .............. 711/138
2006/0004998 A1* 1/2006 Saha et al. ................. 712/245
2006/0064551 A1* 3/2006 Sutanto et al. ............. 711/145
2006/0184741 A1* 8/2006 Hrusecky et al. ........... 711/130

OTHER PUBLICATIONS

Martinez, Jose F. and Torrellas, Josep. "Speculative Synchronization: Applying Thread-Level Speculation to Explicitly Parallel Applications". © 2002 ACM. pp. 18-29.*

* cited by examiner

METHOD TO REDUCE THE NUMBER OF TIMES IN-FLIGHT LOADS ARE SEARCHED BY STORE INSTRUCTIONS IN A MULTI-THREADED PROCESSOR

STATEMENT REGARDING FEDERALLY SPONSORED REASEARCH

This invention was made with Government support under Contract No. NBCH3039004 awarded by the Defense Advanced Research Projects Agency (DARPA). The Government has certain rights in this invention.

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of Invention

This invention relates in general to out-of-order processors, and more particularly, to a method to reduce the number of times in-flight loads are searched by store instructions in a multi-threaded processor.

2. Description of Background

In out-of-order processors, instructions may execute in an order other than what the program specified. For an instruction to execute on an out-of-order processor, only three conditions need normally be satisfied:

(1) the inputs to the instruction are available;

(2) a function unit is available on which to execute the instruction;

(3) there is a place to put the result.

For most instructions, these requirements are relatively straight-forward. However, for load instructions, accurately determining condition (1) is difficult. Load instructions have two types of inputs: (1) registers, which specify the address from which data is to be loaded, and (b) the memory location(s) from which the load data will come. Determining the availability of register values in case (a) is relatively straight-forward. However, determining the availability of memory locations in case (b) is not. The problem with memory locations is that there may be stores earlier in program order than a particular load and some of these stores may not have executed, when the remaining parts of the three conditions above are satisfied, for example, (1) when all of the register inputs for the load instruction are ready, (2) there is a function unit available on which the load can be executed, and (3) there is a place (a register) in which to put the loaded value. Since earlier stores have not executed, it may be that the data locations to which these stores write, are some of the same data locations from which the load reads. In general, without executing the store instructions, it is not possible to determine if the address (data locations) to which a store writes overlap the address from which a load reads.

As a result, most modern out-of order processors execute load instructions when (1) all of the input register values are available, (2) there is a function unit available on which to execute the load, and (3) there is a register where the loaded value may be placed. Since dependences on previous store instructions are ignored, a load instruction may sometimes execute prematurely, and have to be squashed and re-executed so as to obtain the correct value produced by the store instruction.

To detect when a load instruction has executed prematurely, modern processors typically have a load reorder queue (LRQ), which keeps a list of all in-flight loads. In-flight loads have been fetched and decoded by the processor, but have not fully completed their execution, or are waiting on older instructions in the program to finish their execution. Completed means that the loads have finished executing, and thus each of these instructions can be represented to the programmer or anyone else viewing execution of the program as having completed their execution.

The LRQ list is normally sorted by the order of loads in the program. Each entry in the LRQ has, among other information, the address(es) from which the load received data.

Each time a store executes, it checks the LRQ to determine if any loads which are after the store in program order, nonetheless executed before the store, and if so, whether any of those loads read data from a location to which the store writes. If so, the store signals the appropriate parts of the processor that the load has received a bad value and must re-execute.

More importantly for this invention are the related problems that arise when a processor is one of a plurality of processors in a multiprocessor (MP) system. Different MP systems have different rules for the ordering of load and store instructions executed on different processors. At a minimum, most MP processors require a condition known as sequential load consistency. Which means that if processor X stores to a particular location A, then all loads from location A on processor Y must be consistent. In other words, if an older load in program order on processor Y sees the updated value at location A, then any younger load in program order on processor Y must also see that updated value.

If all of the loads on processor Y were executed in order, such sequential load consistency would happen naturally. However, on an out-of-order processor, the younger load in program order may execute earlier than the older load in program order. If processor X updates the location from which these two loads read, then sequential load consistency will be violated.

To avoid problems with sequential load consistency, each time a processor writes to a particular location, it conceptually informs every other processor that is has done so. In practice, most processor systems have mechanisms which avoid the need to inform every processor of every individual store performed by other processors.

These mechanisms for avoiding notification to each processor of every store performed on every other processor, typically center on having a coherence point in the hierarchy of caches serving the processor. The cache closet to the processor is typically labeled the level 1, or L1 cache, the next closet cache the L2, etc. The coherence point in the cache hierarchy is informed of all locations that may be stored to by other processors, but cache levels nearer to the processor than the coherence point are not informed unless they actually contain data being updated by another processor. Typically the coherence point in a multiprocessor system is at the L2 or L3 cache level.

However this approach poses difficulties for processors which employ a technique known as simultaneous multi-threading (SMT). In SMT, a single processor executes multiple threads, possibly sharing data. Each of the threads in an SMT processor acts much like an independent processor in a multi-processor system. In particular, the stores from one thread must be conceptually passed to every other thread in the processor as well as to every other processor in the system.

However, all of the SMT threads in a processor share the closest L1 cache level. Because of this, a more distant cache level like L2 or L3 cannot be used as a coherence point to filter out stores from other threads on the same processor. As a result, every thread in the processor must pay attention to the stores from every other thread in the processor.

Paying attention to every store from every other thread in the processor can be expensive. To illustrate the point, consider how processors deal with the filtered, and relatively small number of snoops coming from other processors. When a processor Y receives a notice (a snoop) that another processor X has written to a location, processor Y must ensure that all of the loads currently in-flight receive sequentially load consistent values. The check to ensure this condition is similar to the check described above for store instructions: each entry in the LRQ is checked to see if it matches the address stored to by the other processor X.

All entries in the LRQ, which match the snoop address have a snooped bit set to indicate that they match the snoop. All load instructions check this snooped bit when they execute. More precisely, when a load instruction (L) executes, it checks all entries in the LRQ to see if there are any load instructions (M) which satisfy all of the following conditions:

(1) load M is younger in program order than the current load L;

(2) load M is from the same address as the current load L;

(3) load M has already executed;

(4) load M has the snooped bit set.

Any load M in the LRQ meeting all of these conditions must re-execute so as to maintain sequential load consistency, for example, to ensure that the younger load Y does not receive an older value than the older load L.

Given the filtering done by the coherence point in the cache for stores done by other processors, the rate at which snoops arrive at a processor and require such processing is typically one snoop every few hundred to every few thousand cycles.

However, in SMT processors with no such filtering from the coherence point and 1 to 7 or more other threads running on the same processor, there are likely to be multiple stores per cycle for which these snoop checks must be performed.

To facilitate such checks, additional ports are needed for the LRQ, and each such port consumes significant area and power. Additional ports also tend to reduce the speed at which the LRQ may be accessed, thus, potentially reducing the frequency at which the processor may run.

The porting requirement for snoops from other threads is not the only problem. There may be many loads in-flight at any one time: modern processors allow 16, 32, 64 or more loads to be simultaneously in-flight. Thus, a load instruction or a snoop must check 16, 32, 64 or more entries in the LRQ to ensure that no loads execute prematurely.

Since new load instructions may occur each cycle in a modern processor, these checks for premature load execution must take at most one cycle, for example, all 16, 32, 64 or more entries in the LRQ must be able to be checked every cycle. Such a fully associative comparison is known to be expensive (a) in terms of the area required to perform the comparison, (b) in terms of the amount of energy required to perform the comparison, and (c) in terms of the time required to perform the comparison, for example, a cycle may have to take longer than it otherwise would so as to allow time for the comparison to complete.

All three of these factors (a), (b) and (c) are significant concerns in the design of modern processors, and improved solutions, such as what is proposed here, are important to continued processor improvement.

The standard solution to limiting the cost of LRQ checking for sequential load consistency is to limit the number of entries in the LRQ, so as to stay within area, power, and cycle time constraints.

Limiting the number of entries in the LRQ limits the number of possible instructions in flight. Out-of-order processors achieve significant performance gains by their ability to execute from a large window of instructions, the larger the window, the more likely that an instruction can be found which has available all of the inputs needed to execute. Thus, the limit placed on LRQ size limits the window of instructions for execution, and thus limits the performance of the processor.

Thus, a solution which checks fewer entries in the LRQ, thus allowing a larger LRQ could contribute to improved performance in an out-of-order processor.

SUMMARY OF THE INVENTION

The shortcomings of the prior art are overcome and additional advantages are provided through the provision of a method for reducing the number of times in-flight loads must be searched by store instructions in a multi-threaded processor comprising: freezing load issue for a thread t_old for a number of cycles; rejecting a t_new load instruction; sending notification to the rest of the processor that the t_new load instruction has been rejected; snooping a load reorder queue (LRQ) of the t_old for any load which comes from a cache line L accessed by the load instruction and thus forces such loads to be re-executed; and changing ownership of line L to thread t_new.

The shortcomings of the prior art are overcome and additional advantages are provided through the provision of a method for reducing the number of times in-flight loads must be searched by store and snoop instructions in a multi-threaded processor involving a load issued prematurely (LIP) structure comprising: checking the LIP structure to determine if any loads executed prematurely and incorrectly.

Additional features and advantages are realized through the techniques of the proposed invention. Other embodiments and aspects of the invention are described in detail herein and are considered a part of the claimed invention. For a better understanding of the invention with advantages and features, refer to the description and to the drawing.

TECHNICAL EFFECTS

As a result of the summarized invention, technically we have achieved a solution for a method for reducing the number of times in-flight loads must be searched by store instructions in a multi-threaded processor. A method for reducing the number of times in-flight loads must be searched by store and snoop instructions in a multi-threaded processor involving a load issued prematurely (LIP) structure is also included.

BRIEF DESCRIPTION OF THE DRAWING

The subject matter, which is regarded as the invention is particularly pointed out and distinctly claimed in the claims at the conclusion of the specification. The foregoing and other objects, features, and advantages of the invention are apparent from the following detailed description taken in conjunction with the accompanying drawing in which:

Figure 1:
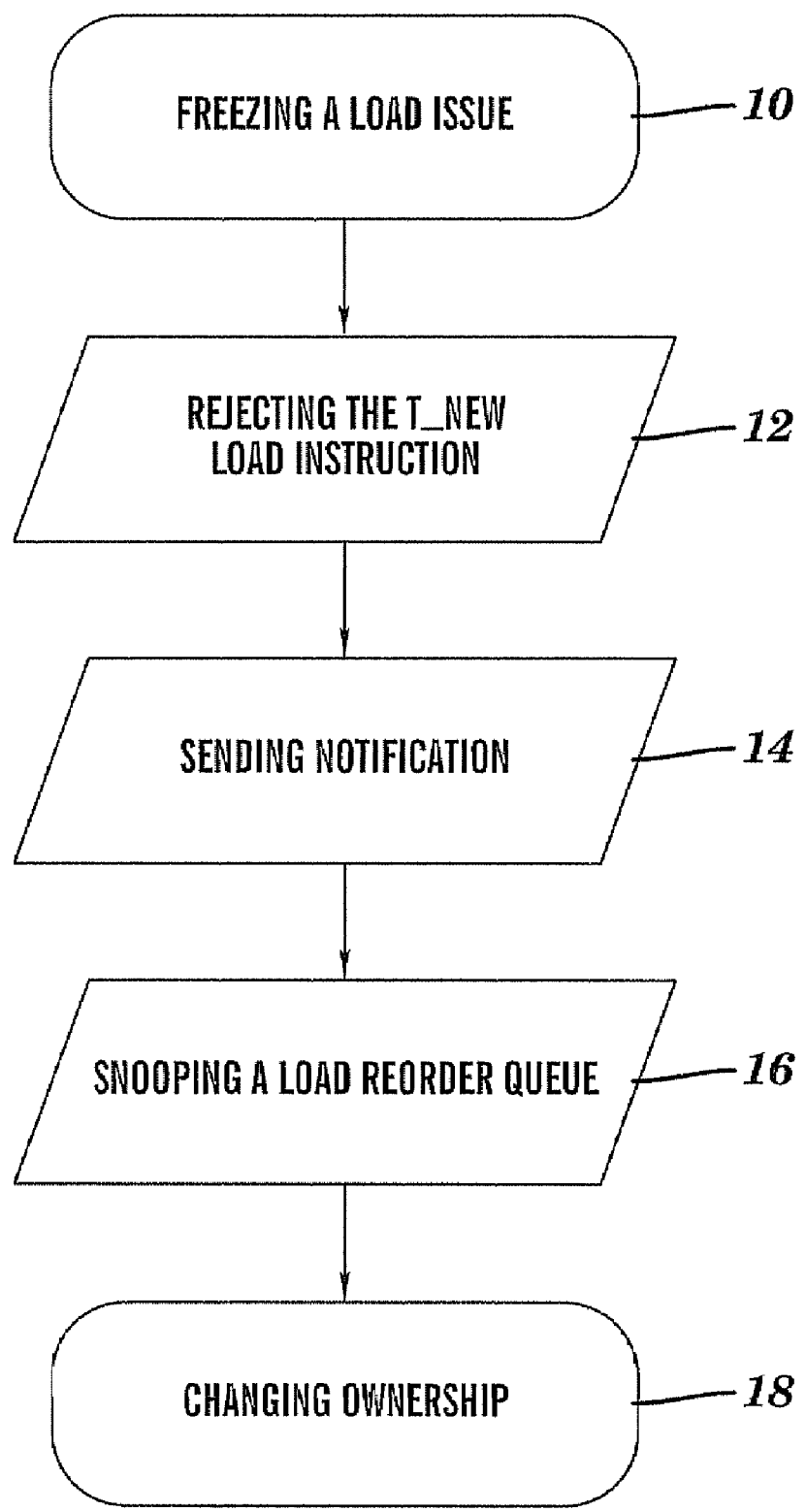
FIG. 1 illustrates one example of a flowchart of a method for reducing the number of times in-flight loads must be searched by store instructions in a multi-threaded processor.

The detailed description explains the preferred embodiments of the invention, together with advantages and features, by way of example with reference to the drawing.

DETAILED DESCRIPTION OF THE INVENTION

An embodiment of the invention applies to an SMT processor with N threads. For an SMT processor with N threads, the proposed invention adds a ceil {log2 [(N)]}-bit threadID (thread identification number) for each L1 cache line. This threadID indicates which of the N threads in the processor owns this cache line. A thread storing to a cache line that it owns, need not alert any of the other threads in the processor to this store. Likewise, any thread loading from a cache line that it owns need not check the LRQ for snoops causing violations of sequential load consistency. Thus, the number of ports on the LRQ can be kept low, and the infrequent usage means that the number of entries in the LRQ can be relatively high.

Any store which attempts at retire time from the store queue to write into the cache memory hierarchy, a line owned by its thread, needs to do only the usual uniprocessor actions, and need not snoop the LRQ of other threads on the same processor. Assuming that the L2 cache is the coherence point of the multiprocessor system, then if the L2 cache has obtained this line in exclusive mode, then other processors also need not be snooped.

Any store which attempts at retire time from the store queue to write to a line owned by another thread on the same processor(s) causes the snoop actions previously described earlier to be performed for the LRQ of the thread which owned the line, and (b) ownership of the line switches to the thread performing the store.

Any load that attempts to read from a line owned by its own thread, need do only the usual uniprocessor actions.

Any load that misses in the L1 cache should bring the line in as usual from the L2, and set the threadID of the line to the threadID of the load.

Any load from thread t_new, that attempts to read from a line L owned by another thread, t_old, on the same processor must obtain ownership of the line for itself before performing the load. If this policy were not followed and if t_new did not obtain ownership of line L, then any subsequent stores in t_old would not snoop the LRQ of t_new since t_old still owns the line, and consistency violations could occur, such as those previously described. A direct way to do such a transfer of ownership includes performing the normal snoop actions previously described, for example, snoop the LRQ of t_old for any load which comes from line L, and force such loads to be re-executed. Then, change ownership of line L to thread t_new.

This method could lead to livelock (repeated executions with no forward progress) if the snooped/rejected loads from thread t_old subsequently reissue while the load from t_new is in flight and unfinished. The loads from t_old would turn the tables and reject the load from t_new. A subsequent reissue of the t_new load would again turn the tables and reject the t_old loads, and so forth, leading to livelock.

As such, embodiments of the invention include the following, slightly more complicated method, which addresses this livelock problem and leads to forward progress in both threads. Thus, when thread t_new issues a load and the line is owned by another thread t_old, embodiments of the invention operate as shown in FIG. 1. The processing starts at step 10 by freezing (prohibiting) a load issue for thread t_old for a number (referred to by a variable load_consis_freeze) of cycles, so that no new loads for line L are put in flight.

Reasonable values for load_consis_freeze may be in the 8-16 cycle range. The chosen values should allow existing loads to line L from t_old to finish, malting subsequent snoop from t_new essentially a NOP.

At step 12, the t_new load instruction is rejected.

At step 14, notification is sent to the rest of the processor that the t_new load instruction has been rejected. In the rejection notification sent to the rest of the processor, an indication that when the load reissues it should be more assertive shall also be transmitted.

At step 16, there is a snoop of the load reorder queue (LRQ) for any loads which come from thread t_old and are in line L and thus forces such loads to be re-executed. For example, snoop the LRQ for any loads that come from the t_old and line L and this time reject/flush such loads.

At step 18, ownership of line L is changed to thread t_new.

When the load from thread t_new reissues, the loads to line L from t_old are likely done, since there will generally be a delay before reissue, and there may have been no load to line L in flight from thread t_old in any case.

Thus, when the assertive actions previously discussed are performed during the reissue of the t_new load, the snoop will likely act as a NOP, since the t_old loads will have finished, and there will hence be no loads in the t_old LRQ matching the snoop.

This method attempts to let loads in flight in other threads finish, while ensuring that no more such problem loads are issued. Thus, forward progress should generally be made and livelock avoided.

To emphasize this point, note that if the t_old issue pause of load_consis_freeze cycles expires while the load from t_new is in flight, any load from line L from t_old will initially be rejected, and likewise pause for load_consis_freeze cycles. By which time, it is likely that the t_new load will have finished. Thus, although the two threads trying to access line L may encounter each other, they will not deadlock or livelock.

An alternate embodiment of the proposed invention uses a LIP (load issue prematurely) structure concept for ensuring correct execution of load instructions in an out-of-order processor, applicable with single and multiprocessor systems.

With the LIP concept, the load reorder queue (LRQ) is divided into two parts. The first part being the LRQ, which is a FIFO structure where loads enter at dispatch time and leave at completion/retire time. Loads both enter and leave in program order.

The second part being the LIP, which is a cache-like structure indexed by address. Loads enter at issue time, or more precisely when the real address of the load is known. Loads exit at completion/retire time in program order.

In this alternate LIP method, stores and snoops check the LIP instead of the LRQ, to determine if any loads executed prematurely and incorrectly. The only change from the previous embodiment is that checks of the LRQ are replaced by checks of the LIP.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for reducing the number of times in-flight loads are searched by store instructions in a multi-threaded processor, the method comprising:
   i. freezing load issue for a thread t-old for a number of cycles when a thread t-new issues a load instruction and a cache line L is owned by thread t-old such that no new loads for the cache line L are put in flight, wherein the number of cycles is between 8 and 16 cycles to allow existing loads to line L from t-old to finish, making a subsequent snoop from t-new a NOP;
   ii. rejecting the t-new load instruction;
   iii. sending notification to the rest of the processor that the t-new load instruction has been rejected;
   iv. snooping a load reorder queue (LRQ) of thread t-old for any load which comes from the cache line L accessed by the t-old load instruction and then forcing such loads to be re-executed; and
   v. changing ownership of cache line L to thread t-new.

2. The method of claim 1 wherein:
the processor is an out-of-order processor.

3. The method of claim 1 further comprising:
associating an identification bit with each cache line, the identification bit identifying a thread in the multi-threaded processor owning the cache line.

* * * * *